(12) United States Patent
Yamamoto

(10) Patent No.: US 6,247,395 B1
(45) Date of Patent: Jun. 19, 2001

(54) HIGH-FREQUENCY THAWING APPARATUS

(75) Inventor: Yasuji Yamamoto, Takarazuka (JP)

(73) Assignee: Yamamoto Vinita Co., Ltd., Osaka-fu (JP)

( * ) Notice: Subject to any disclaimer, the term of this patent is extended or adjusted under 35 U.S.C. 154(b) by 0 days.

(21) Appl. No.: 09/673,154

(22) PCT Filed: Mar. 3, 1999

(86) PCT No.: PCT/JP99/01018

§ 371 Date: Oct. 11, 2000

§ 102(e) Date: Oct. 11, 2000

(87) PCT Pub. No.: WO00/51450

PCT Pub. Date: Sep. 8, 2000

(51) Int. Cl.$^7$ ................. A23L 1/00; A23L 3/00; A23L 3/365; F24C 7/02; H05B 6/68

(52) U.S. Cl. .................. 99/451; 99/358; 99/443 C; 99/483; 99/DIG. 14; 219/707; 219/771; 219/780

(58) Field of Search ............... 99/358, 443 R, 99/443 C, 467, 474–479, 451, 483, DIG. 14; 219/700, 705, 707, 735, 757, 771, 780, 775, 779; 392/317, 331, 338, 497; 426/243, 244, 241, 614

(56) References Cited

U.S. PATENT DOCUMENTS

| | | | |
|---|---|---|---|
| 3,876,373 | * 4/1975 | Glyptis | 422/22 X |
| 4,524,079 | * 6/1985 | Hofmann | 426/234 |
| 5,250,160 | * 10/1993 | Oksman et al. | 99/451 X |
| 5,282,940 | * 2/1994 | Griffis et al. | 426/237 |
| 5,290,583 | * 3/1994 | Reznik et al. | 426/521 X |
| 5,415,882 | * 5/1995 | Knipper et al. | 426/237 |
| 5,514,391 | * 5/1996 | Bushnell et al. | 426/237 |
| 5,527,105 | * 6/1996 | Riach, Jr. | 426/237 |
| 5,534,278 | * 7/1996 | DeRuyter et al. | 99/451 X |
| 5,562,024 | * 10/1996 | Polny, Jr. | 99/483 X |
| 5,603,972 | * 2/1997 | McFarland | 422/22 |
| 5,607,710 | * 3/1997 | DeRuyter et al. | 99/DIG. 14 |
| 5,630,360 | * 5/1997 | Polny, Jr. | 99/358 X |

* cited by examiner

Primary Examiner—Timothy F. Simone
(74) Attorney, Agent, or Firm—Jordan and Hamburg LLP

(57) ABSTRACT

An object of a high-frequency thawing apparatus is to uniformly thaw an entirety of an article with high efficiency and high-speed, particularly an article having a relatively large thickness. The apparatus is so constructed that a high-frequency power from a high-frequency generating circuit is supplied to a pair of opposing electrodes by way of an impedance matching circuit including a transformer to thaw an article (F) which is carried in between the opposing electrode pair by dielectric heating. The impedance matching circuit includes an electrostatic capacitor section (C) and an inductance section (L). A conductor each constituting the inductance section (L) has such a length that the downstream-located conductor with respect to the transport direction of a conveyor is longer than the upstream-located conductor.

11 Claims, 7 Drawing Sheets

HIGH-FREQUENCY THAWING APPARATUS

BACKGROUND ART

This invention relates to a high-frequency thawing apparatus for supplying a high-frequency power to a pair of opposing electrodes to thaw an article such as a frozen food carried in between the electrodes by dielectric heating.

Japanese Examined Patent Publication Nos. 51-15100 and 55-46152, for example, propose a high-frequency thawing apparatus in which a group of frozen articles to be thawed (hereinafter, merely referred to as "article") are serially carried on a conveyor and introduced into an electric field generated by application of a high frequency to a pair of opposing electrodes while passing therebetween, thereby being thawed one after another.

The conventional thawing apparatuses has such an arrangement that a signal of a high frequency from a high frequency generating circuit is power-amplified by a transformer and the amplified voltage is supplied to one of the pair of electrodes (namely, the high-voltage electrode) for high-voltage application to generate a high frequency electric field between the high-voltage electrode and the other one of the electrodes which is connected to the ground (namely, ground electrode). The article interposed between the high-voltage electrode and the ground electrode is heated by dielectric loss.

Generally, the dielectric constant of the article rises as the thawing is carried on. Namely, the dielectric heating causes an impedance change on time-basis. Accordingly, it is necessary to vary a high-frequency power to be supplied to the article as the thawed state of the article, which is a load in the high-frequency power generating circuit, varies (namely, a matching control of the high-frequency power is necessary). Particularly, since the dielectric constant greatly differs between ice and water, the following problem occurs in the case where the article is expected to be heated up to a temperature around 0° C. after thawing. The amount of water that has been contained in the article in a super-cooled state changes as the article is heated and, accordingly, the above matching control of the high-frequency power supply in the high-frequency thawing apparatus is extremely difficult. It has been practically impossible to uniformly heat a plurality of frozen articles while serially conveyed by using a pair of electrodes or a single power generating device.

In the case where a thick block of article is thawed by heat with use of the thus constructed conventional thawing apparatus, a portion of the article adjoining the high-voltage electrode is apt to be more heated than a portion opposite and away from the high-voltage electrode. Thus, heated state differs portion by portion of the article, thereby making it difficult to uniformly thaw the article.

Further, in the case of transporting the article on the conveyor, it is required to finalize thawing of the article by dielectric heating before the instant article completely passes the space in between the pair of electrodes. This requires to set the high-frequency power at a relatively high level. Consequently, there is a possibility that conspicuous is a so-called "edge effect" due to the electric field generation in which an edge of the article is apt to be more heated than the other part of the article, thereby resulting in a non-uniform thawed state between inner part and outer part of the article.

DISCLOSURE OF THE INVENTION

This invention has been invented to solve the above problems residing in the prior art. It is an object of this invention to provide a high-frequency thawing apparatus in which a group of articles are sequentially transported on a conveyor to thaw the articles one after another. The apparatus is provided with a plurality of pairs of electrodes arrayed in a thawing chamber which also functions as an electromagnetic shield to uniformly thaw the article with heat in accordance with a change of the dielectric constant of the article.

According to an aspect of this invention, a high-frequency thawing apparatus comprises: a conveyor unit for transporting an article to be thawed in a predetermined direction; a thawing chamber in which at least part of the conveyor unit over which the article is to be transported is encased; a plurality of opposing pairs of electrodes, each electrode pair arrayed side by side in the transport direction of the conveyor unit apart at a certain interval in the thawing chamber; a plurality of high-frequency power generating circuits provided in correspondence to the plurality of electrode pairs to generate a high-frequency field in between each pair of the electrodes; and a plurality of impedance matching circuits provided between the respective high-frequency power generating circuits and conductors (sic), each impedance matching circuit including a conductor with an inductance different to each other.

In the above arrangement, the length of at least one of the conductors provided downstream from the other conductor with respect to the transport direction of the conveyor unit may be longer than that of the other conductor.

Three pairs of the opposing electrodes may be provided, and the respective conductors corresponding to the three pairs of electrodes may have different lengths to one another.

Alternatively, three pairs of the opposing electrodes may be provided, and the length of the conductor corresponding to the most downstream-located electrode pair with respect to the transport direction of the conveyor unit may be set longer than that of the other two conductors.

Further, the opposing electrode pairs may be arranged such that the distance between the corresponding electrodes of the adjacent electrode pairs is longer than that between the opposing electrode pair.

The high-frequency thawing apparatus may further comprise a plurality of elevating units each adapted for moving at least one of the corresponding electrode pair up and down.

The transport speed of the conveyor unit may be set variable.

Further, each of the high-frequency power supply devices (sic) may be intermittently driven.

The intermittent driving may be so controlled as to change at least one of a drive period and a pause period for each of the high-frequency power generating circuits.

Also, a circuit on a load side where a high-frequency power is to be supplied including the opposing electrode pair may have a balance circuitry configuration.

Alternatively, a circuit on a load side where a high-frequency power is to be supplied including the opposing electrode pair may have an unbalance circuitry configuration.

BEST MODE FOR CARRYING OUT THE INVENTION

Figure 2:
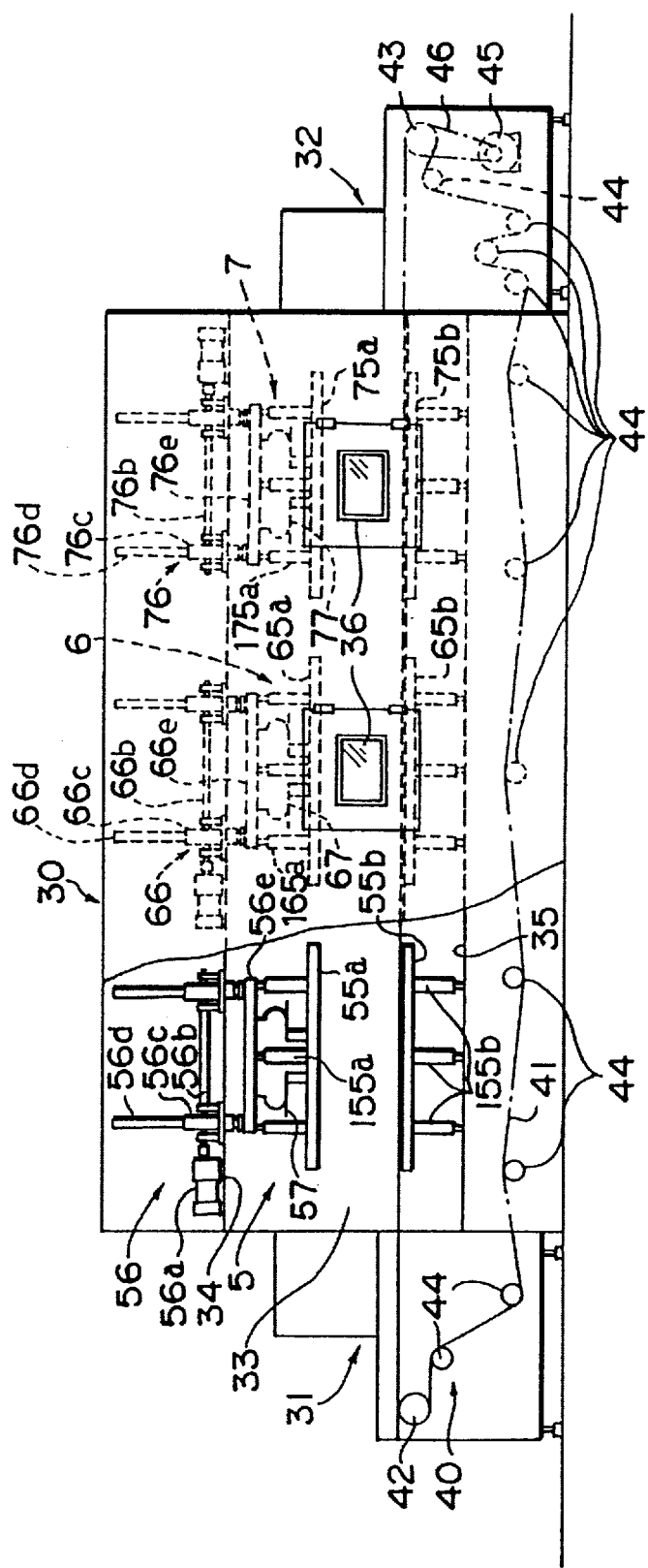
FIG. 2 is a partially broken front view of the high-frequency thawing apparatus as an embodiment of this invention.
Figure 3:
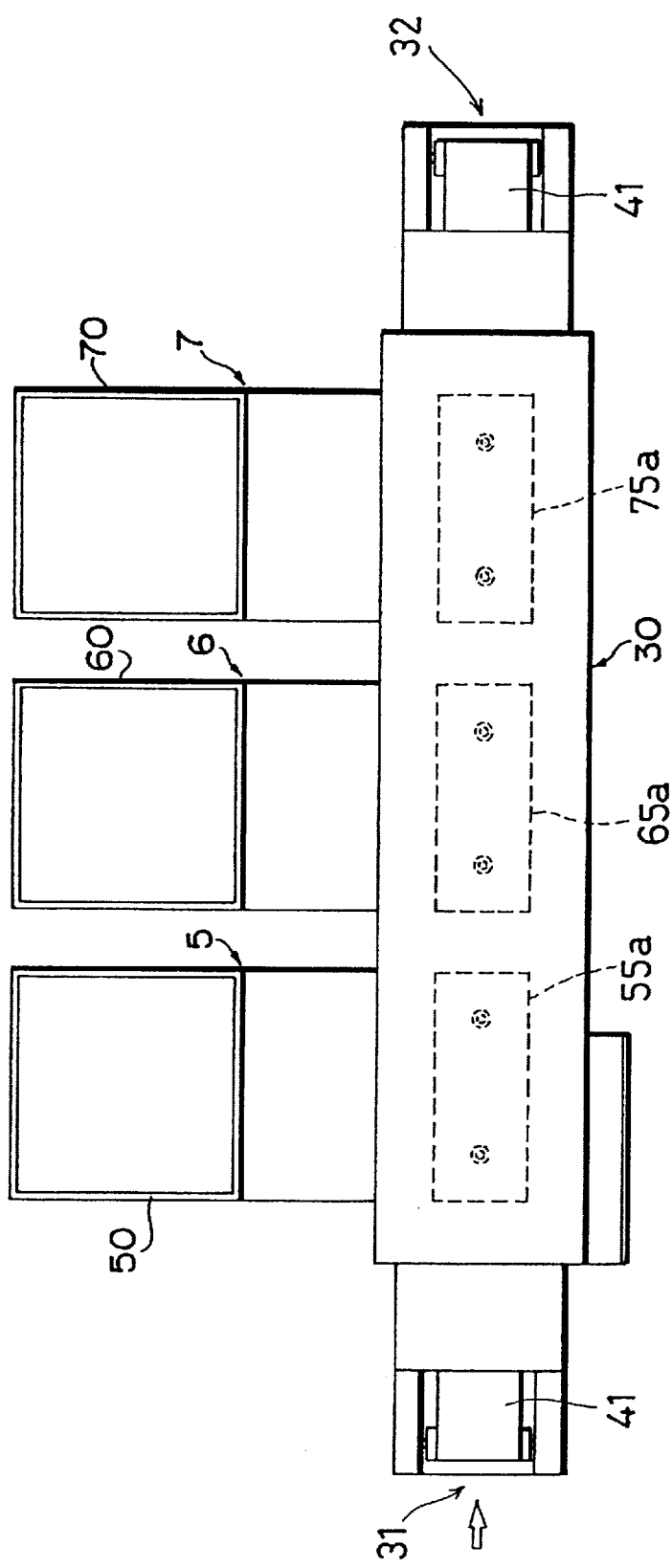
FIG. 3 is a plan view of the high-frequency thawing apparatus as the embodiment.
Figure 4:
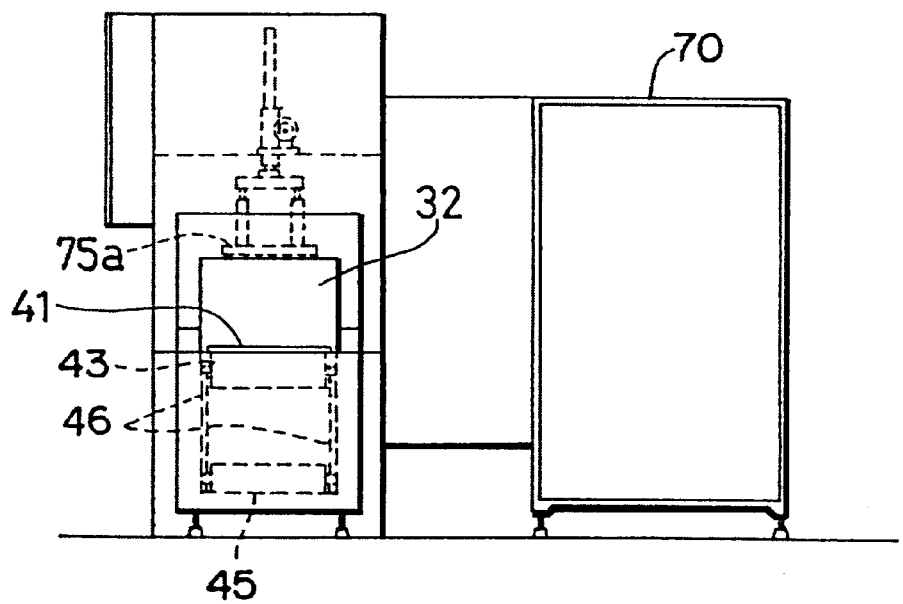
FIG. 4 is a side view of the high-frequency thawing apparatus as the embodiment.

A high-frequency thawing apparatus embodying the present invention is described with reference to FIGS. 2 to 4. FIG. 2 is a partially broken front view, FIG. 3 is a plan view, and FIG. 4 is a side view of the thawing apparatus.

The thawing apparatus comprises a thawing chamber 30 formed with an inlet 31 and an outlet 32 each opposing a wall thereof, a conveyor unit 40 which circulates in the thawing chamber 30 to transport an article to be thawed (hereinafter, merely referred to as "article") from the inlet 31 toward the outlet 32, and three sets of high-frequency power supply devices 5,6,7 disposed in this order from the inlet in the transport direction of the conveyor unit 40. The thawing chamber 30 is formed with an inner space (interior) 33 having a substantially rectangular shape in vertical and transverse cross section. The walls of the thawing chamber 30 function as an electromagnetic shield. One of the walls (front wall in FIG. 2) of the thawing chamber 30 is formed with a window 36 each opposing the high-frequency power supply device 5 (6, 7) through which an operator can monitor the state of the article being thawed in the interior 33.

The conveyor unit 40 has an endless belt 41, inverting rollers 42 and 43 respectively provided near the inlet 31 and outlet 32 to invert the moving direction of the endless belt 41, a certain number of guide rollers 44 to apply a certain tension force to the endless belt 41, a drive motor 45 for generating a driving force to circulate the endless belt 41 at a given speed, and a synchronous belt 46 to transmit the driving force of the drive motor 45 to the inverting roller 43.

Some of the guide rollers 44 are provided below a lower half part of the conveyor unit 40. Rendering the guide rollers 44 alternately in contact with an upper and a lower surface of the endless belt 41 enables to eliminate a flexure of the endless belt 41 so as to prevent idle rotation of the guide rollers 44 with respect to the endless belt 41. This arrangement securely transports the article placed on the endless belt 41 at a constant speed.

The endless belt 41 is made of a material having such a strength as to eliminate downward flexure of the endless belt 41, e.g., made of a teflon material. As described later, the endless belt 41 has a certain width to securely carry an article having certain dimensions. The surface of the endless belt 41 may be flat or formed into a mesh. The latter arrangement simplifies the construction for introducing cool air in order to cool the interior 33 of the thawing chamber 30.

As an altered form of the endless belt 41, there may be used a so-called "timing belt" in which a series of projections and recesses are alternately formed at a certain pitch on the backside surface of the endless belt 41. In the case where the endless belt 41 is formed of a timing belt, a series of projections and recesses engageable with the respective recesses and projections of the backside surface of the endless belt 41 are formed on the outer circumference of the inverting rollers 42, 43 and guide rollers 44. This arrangement makes it possible to synchronize the transport speed of the endless belt 41 with the rotating speed of the inverting roller 43 so as to transport the article without an idle stay on the endless belt 41.

Alternatively, the endless belt 41 may be formed with perforations at a certain interval near opposite lateral ends thereof along the transport direction of the article, and the outer circumference of the inverting rollers 42, 43 may be formed with a sprocket (radial projections) engageable with the perforations of the endless belt 41. Similar to the above arrangement where a timing belt is provided, this arrangement also enables to synchronize the transport speed of the endless belt 41 with the rotating speed of the inverting roller 43 to transport the article at a constant speed without an idle stay on the endless belt 41.

The arrangement of the conveyor unit 40 is not limited to the one shown in the above where the endless belt 41 is employed, but may be in the form of a roller conveyor in which a number of rollers are arrayed at a certain interval with a rotary axis thereof aligned in a horizontal direction to transport the article over the outer circumference thereof, or a crawler conveyor in which trains of flat plates with a relatively short length in a direction orthogonal to the transport direction of the conveyor unit 40 are linked to one another via a linking rod to define an endless track.

Further, a cleaning device may be provided and so constructed as to eject a stream of water onto the endless belt 41 when the part of the endless belt 41 which has carried the article circulatively reaches the lower half part of the conveyor unit 40 to clean the possibly stained part of the endless belt 41.

The high-frequency power supply devices 5, 6, 7 have substantially the configuration identical to one another. As depicted in FIG. 3, housing 50, 60, 70 are provided behind the thawing chamber 30 to house power units for the power supply device 5, 6, 7, respectively. As illustrated in FIG. 2, the power supply devices 5, 6, 7 are respectively incorporated with elevating devices 56, 66, 76 which upwardly and downwardly move pairs of upper electrode 55a, 65a, 75a and lower electrode 55b, 65b, 75b, each pair being flat and disposed in a face-to-face manner. A high-frequency power is supplied from the power unit in the housing 50 (60, 70) to the upper electrode 55a (65a, 75a) and lower electrode 55b (65b, 75b).

The lower electrode 55b (65b, 75b) is securely supported by a certain number of insulating supports 155b (165b, 175b) downwardly standing from the bottom surface thereof so as to lie horizontal relative to a lower frame 35 of the thawing chamber 30 or its equivalent. The middle one of the supports 155b (165b, 175b) has, for example, a tubular shape. Providing an electric wire in the middle tubular support 155b (165b, 175b) enables to supply a high-frequency power to the lower electrode 55b (65b, 75b). Alternatively, an electric wire may be so provided as to be substantially parallel with the support(s) 155b (165b, 175b).

The upper electrode 55a (65a, 75a) is connected to a support plate 56e (66e, 76e) of the elevating device 56 (66, 76) via a certain number of insulating supports 155a (165a, 175a) upwardly standing from the upper surface thereof. A conductor 57 (67, 77) is provided in a space defined by the upper electrode 55a (65a, 75a) and the insulating supports 155a (165a, 175a) to supply a high-frequency power from the power unit 50 (60, 70) of the power supply device 5 (6, 7) to the upper electrode 55a (65a, 75a). Each conductor 57 (67, 77) has a plate-like shape to constitute an inductance section L of an impedance matching circuit, which is described later.

The height of connecting parts 57a, 67a, 77a of the conductors 57, 67, 77 connected to the respective upper electrodes 55a, 65a, 75a is differentiated in such a manner that the conductor located upstream (sic) with respect to the transport direction of the conveyor unit 40 has a longer length than the one located downstream (sic), namely, the length of the conductors 57, 67, 77 is such that the length of the conductor 77 is longer than that of the conductor 67 and that the length of the conductor 67 is longer than that of the conductor 57. This arrangement increases the inductance of the conductors 57, 67, 77 as the article is transported from upstream to downstream. Accordingly, the matching control of impedance is effected by an impedance matching circuit 53 (63, 73) including the conductor 57 (67, 77) in such a manner as to take measures to an undesirable impedance change of the load (article) in the high-frequency generating circuit 52 (62, 72) resulting from rise of the dielectric constant of the article F due to progress of the thawing as the article F is transported downstream. Consequently, minimized is a loss of the high-frequency power which is equivalently supplied to the conductor 57 (67, 77), and a group of articles F can be serially and uniformly thawed by heat.

The elevating device (56, 66, 76) is mounted on an upper frame 34 of the thawing chamber 30, and comprises an elevating motor 56a (66a, 76a), a pair of left and right worm gears 56c (66c, 76c) which convert a rotating movement of an output shaft 56b (66b, 76b) of the elevating motor 56a (66a, 76a) into a linear motion, and a pair of elevating shafts 56d (66d, 76d) each of which is meshed with the output shaft 56b (66b, 76b) by way of the corresponding worm gear 56c (66c, 76c) and has a lower end connected to a support plate 56e (66e, 76e). When the elevating motor 56a (66a, 76a) is driven, the height of the upper electrode 55a (65a, 75a) relative to the upper frame 34 is changed in accordance with the rotating amount and direction of the motor, thereby causing the upper electrode 55a (65a, 75a) to move upward or downward while maintaining its horizontal posture.

It should be appreciated that the upper electrode 55a (65a, 75a) and the corresponding lower electrode 55b (65b, 75b) are not necessarily driven with the same phase. The power supplied to each pair of upper and lower electrodes may be differentiated or the phase during an intermittent driving may be differentiated. Further, it should be noted that the electric field generated between the upper electrode 55a (65a, 75a) and lower electrode 55b (65b, 75b) may affect the outside of the electrode, not to mention the space between the opposing electrode pair. Accordingly, it is preferable to set the distance between the adjacent upper electrodes 55a and 65a (lower electrodes 55b and 65b) and the distance between the adjacent upper electrodes 65a and 75a (lower electrodes 65b and 75b) at about the same distance as or greater than the distance between the opposing electrode pair 55a and 55b (65a and 65b, 75a and 75b). Specifically, in the case where the distance between the upper electrode 55a (65a, 75a) and the opposing lower electrode 55b (65b, 75b) is 250 mm, it is preferable to set the distance between the upper electrodes 55a and 65a (65a and 75a) and the lower electrodes 55b and 65b (65b and 75b) between 400 and 600 mm. Generally, it is preferable to set the distance between the adjacent pairs of electrodes at about 1.5 to 2.5 times as wide as the distance between the opposing pairs of electrodes.

Figure 6:
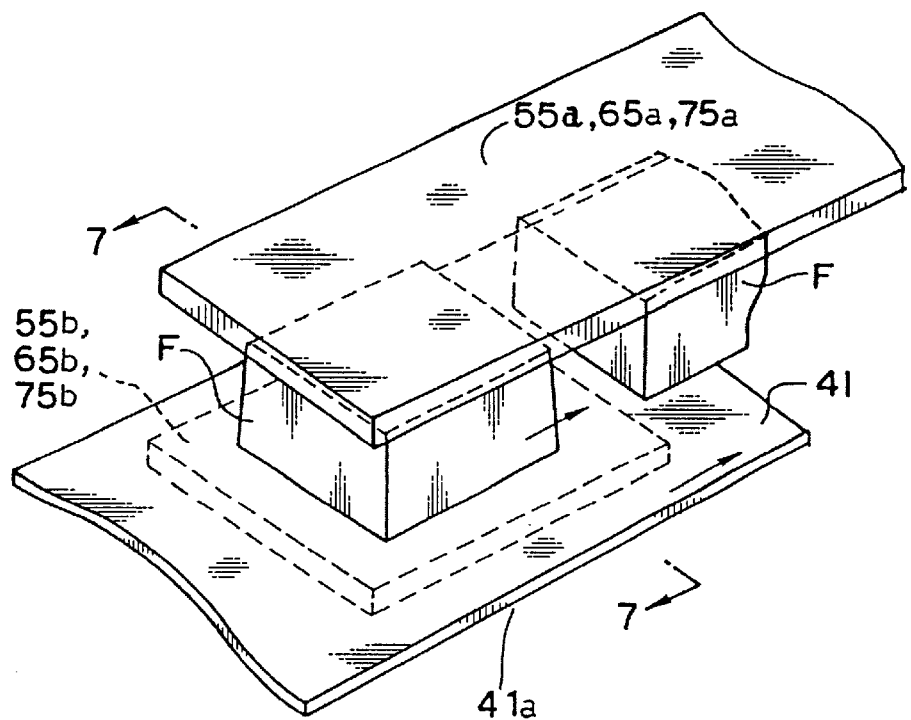
FIG. 6 is a perspective view showing a positional relation among an article, a pair of opposing electrodes and an endless belt.
Figure 7:
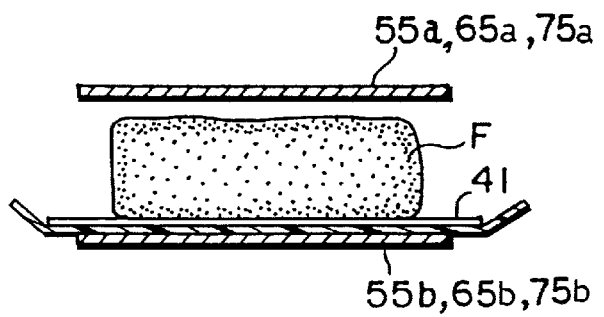
FIG. 7 is a cross-sectional view taken along the line 7—7 in FIG. 6.

FIG. 6 is a perspective view showing a positional relation among the article F such as a frozen food, each pair of upper and lower electrodes 55a and 55b (65a and 65b, 75a and 75b), and endless belt 41. FIG. 7 is a 7—7 cross-sectional view of FIG. 6.

The article F placed on the endless belt 41 is transported by the moving endless belt 41 and applied with a high-frequency power only for a period while passing through the electric field of high-frequency defined by the opposing pairs of upper and lower electrodes 55a and 55b, 65a and 65b, and 75a and 75b, thereby being thawed with heat.

Setting the width and length of the electrodes 55a, 55b, 65a, 65b, 75a, 75b greater than the corresponding width and length of the article F enables to uniformly distribute the generation of electric field throughout the article F. In particular, it may be preferable to set the length of the electrode with respect to the transport direction of the conveyor unit 40 several times as long as the corresponding length of the article F so as to enable simultaneous thawing of a group of articles carried sequentially.

As depicted in FIG. 7, the endless belt 41 slides over the upper surface of the lower electrodes 55b, 65b, 75b. A synthetic resin film 58 made of, for example, polytetrafluoroethylene (PTFE), polypropylene (PP), or polyethylene (PE) is provided between the endless belt 41 and the lower electrode 55b (65b, 75b) to reduce the friction caused therebetween. The resin film 58 not only functions as a friction reducer that reduces the friction between the endless belt 41 and the lower electrode 55b (65b, 75b) but also as a tray which receives drips of liquid such as water from the article F. In consideration of the latter function, it may be preferable to provide the resin film 58 in such a manner as to cover an entire track along which the article F is supposed to be transported including a region between the adjacent lower electrodes 55b and 65b, and 65b and 75b. Use of the resin film 58 in the form of a continuous sheet enables to prevent occurrence of a short circuit and stains which may result from adhesion of drips from the article F onto the lower electrode 55b, 65b, or 75b. Also, the continuous sheet form of resin film 58 facilitates exchange of the resin film with a new one when the instant resin film is stained.

In general, it may be preferable to reduce the distance between the upper surface of the article F and the upper electrode 55a (65a, 75a) and the distance between the bottom surface of the article F and the lower electrode 55b (65b, 75b) respectively in order to efficiently thaw the article F. In the case where the surface of the article F is non-flat (namely, protrusion and recess are formed on the surface), however, reducing the distance between the upper surface of the article F and the upper electrode 55a (65a, 75a), for example, may undesirably increase the ratio of the distance between the electrode and protrusion on the surface of the article F to the distance between the electrode and recess on the surface of the article F, thereby obstructing uniform thawing of the article F with a resultant temperature variation between the protrusion and recess of the article F.

In order to eliminate the above problem, it may be preferable to drive the elevating device 56 (66, 76) to adjust the distance between the upper surface of the article F and the upper electrode 55a (65a, 75a) and the distance between the bottom surface of the article F and the lower electrode 55b (65b, 75b) in accordance with the protruded and recessed state of the article F. In the case where the variation of the protrusion and recess on the article surface is relatively small, reducing the distance between the upper surface of the article F and the upper electrode 55a (65a, 75a) or the distance between the bottom surface of the article F and the lower electrode 55b (65b, 75b) may be acceptable for efficient thawing. However, in the case where the variation of the protrusion and recess on the article surface is relatively great, it may be preferable to widen the distance between the upper surface of the article F and the upper electrode 55a (65a, 75a) or the distance between the bottom surface of the article F and the lower electrode 55b (65b, 75b) for uniform thawing.

As shown in FIG. 7, in this embodiment, the endless belt 41 is so constructed as to slide over the lower electrodes 55b, 65b, 75b with the resin film interposed in between. The distance between the upper surface of the lower electrodes 55b, 65b, 75b and the bottom surface of the article F is fixed. The substantial distance between the lower electrode 55b (65b, 75b) and the bottom surface of the article F, however, becomes wider than what is determined as the distance between these elements due to the existence of the endless belt 41 and the resin film 58 (68, 78) which is interposed between the lower electrode 55b (65b, 75b) and the bottom surface of the article F. This arrangement does not involve any specific problem and rather contributes to suppressing the variation of thawed state in the vicinity of the bottom portion of the article F as relatively small as possible despite the fixed distance between the lower electrode 55b (65b, 75b) and the bottom surface of the article F.

Figure 8:
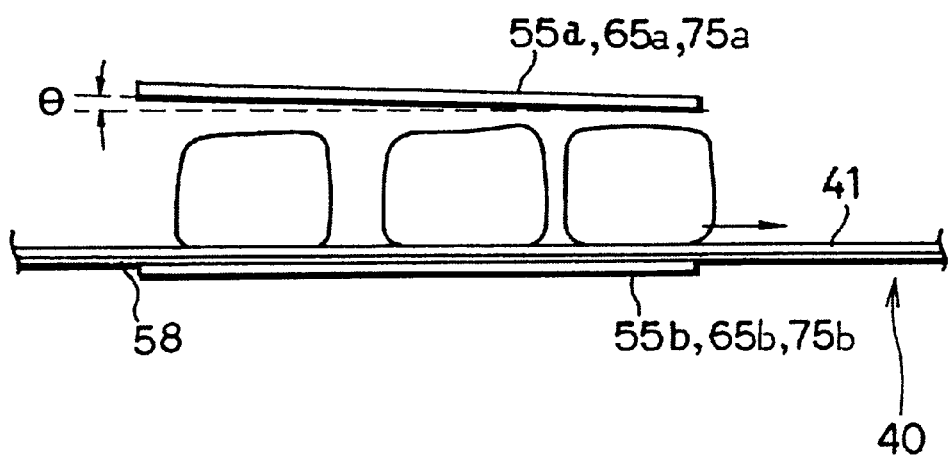
FIG. 8 is a diagram of a modified construction of the pair of opposing electrodes.

Next, a modified embodiment of the upper electrodes 55a, 65a, 75a is shown in FIG. 8. In this modification, the entirety of the upper electrodes 55a, 65a, 75a is so tilted as to sequentially shorten the distance between the opposing pair of electrodes from upstream toward downstream with respect to the transport direction of the conveyor unit 40, namely, throughout the inlet portion to the outlet portion of the thawing chamber 30.

As the article F is being carried over the endless belt 41 of the conveyor unit 40 from the upstream-located electrode pair 55a and 55b to the electrode pair 65a and 65b, and then to the downstream-located electrode pair 75a and 75b, thawing is gradually proceeded and, thus, the impedance of the load is changed as the thawing is progressed. The lower the temperature of the article F is, the lower the impedance of the load is, and as the thawing is progressed, the impedance gradually rises. FIG. 8 shows an arrangement of the opposing electrode pairs such that the distance between the opposing electrode pair is gradually decreased from upstream to downstream with respect to the transport direction of the conveyor unit 40 in such a manner that the distance between the electrode pair 65a and 65b is shorter than that between the electrode pair 55a and 55b, and the distance between the electrode pair 75a and 75b is shorter than that between the electrode pair 65a and 65b. In this way, the impedance matching is effected following the impedance change of the load. This arrangement enables to allow the article F to be subjected to the effect of electric field with substantially the same intensity while passing through the space defined by the opposing electrode pairs 55a and 55b, 65a and 65b, and 75a and 75b one after another, whereby the article F is uniformly thawed.

The three upper electrodes 55a, 65a, 75a may be tilted substantially at the same inclination θ. Alternatively, the inclination θ may be varied one from another among these three upper electrodes in accordance with a change of the temperature rise ratio of the article F. As an altered form, the first-stage upper electrode (upper electrode 55a) and the second-stage upper electrode (upper electrode 65a) may be disposed in parallel with the corresponding lower electrodes 55b and 65b respectively, while the last-stage upper electrode (upper electrode 75a) may be tilted at a certain inclination with respect to the lower electrode 75b.

Figure 1:
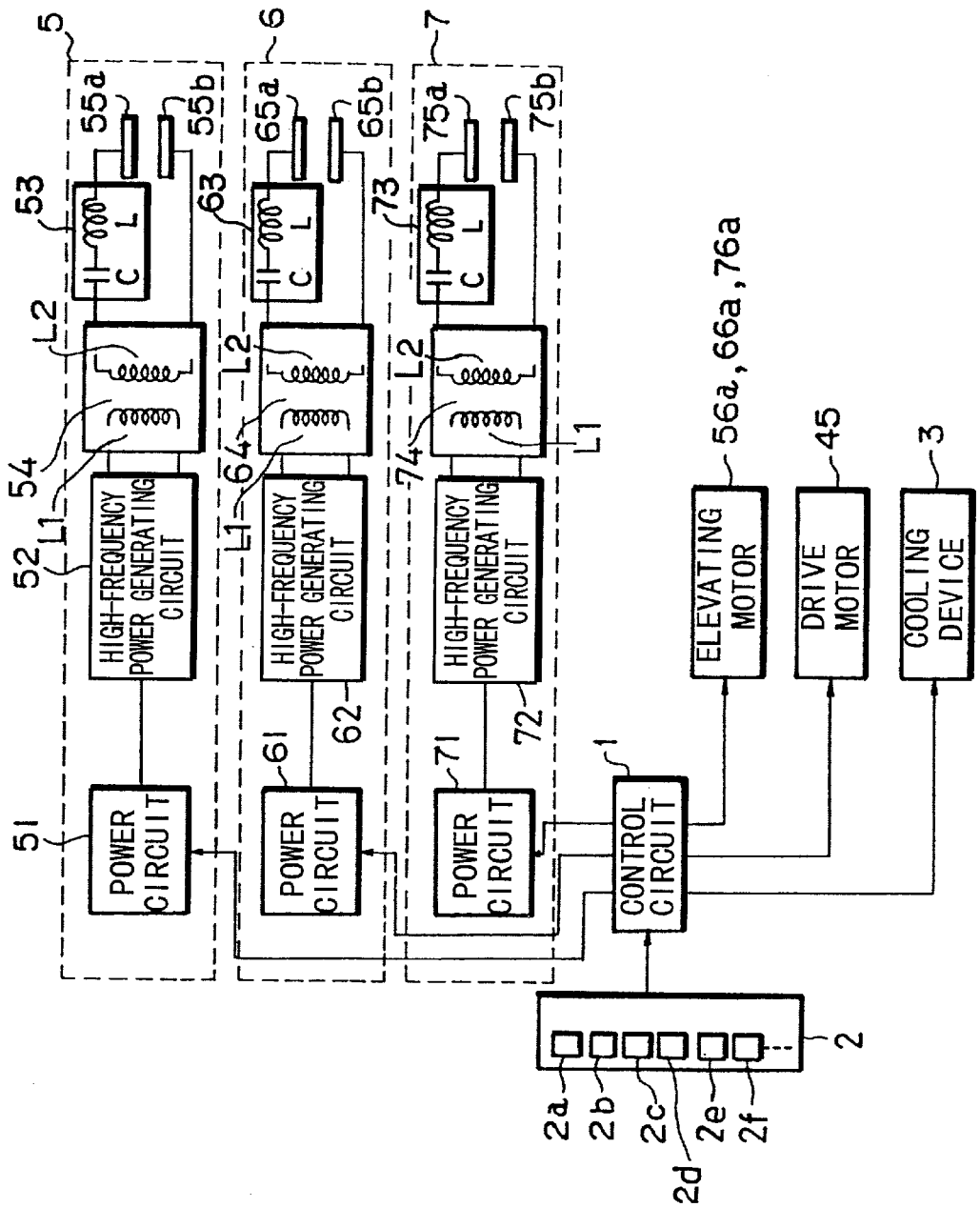
FIG. 1 is a circuit diagram of a high-frequency thawing apparatus according to this invention.

Next, a circuit configuration of the thus constructed high-frequency thawing apparatus of this invention is described with reference to FIG. 1. Reference numeral 1 is a control circuit that centrally controls operations of the high-frequency thawing apparatus. Reference numeral 2 is an operation section by way of which operational data inputted by an operator is read to control driving of each element constituting the apparatus and power supply of the high-frequency power supply devices 5, 6, 7. The operation section 2 is provided with a main switch 2 for controlling start-up and stop of the apparatus, up-and-down switch 2b for selectively changing the rotating direction of the elevating motor 56a (66a, 76a) in forward or reverse direction, a speed setting switch 2c for setting the speed at which the endless belt 41 is driven, a power setting switch 2d for designating a power level to be supplied to the high-frequency power supply device 5 (6, 7) as well as an adjustment thereof, a thermo-control switch 2f for controlling the degree of cooling air supply into the thawing chamber 30 or the temperature inside the thawing chamber 30, etc. A cooling device 3 includes an air-compressor and is adapted to blow chilled air at a temperature of a few degrees minus ten to minus few degrees in Celcius onto the article F being carried on the endless belt 41 of the conveyor unit 40.

As described above, the high-frequency power supply device 5 (6, 7) is designed to supply a high-frequency power to the opposing pair of upper and lower electrodes 55 and 55b (65a and 65b, 75a and 75b). The construction of the high-frequency power supply devices 5, 6, 7 is substantially identical to one another. As an example, the high-frequency power supply device 5 (6, 7) comprises a power circuit 51 (61, 71) for converting a power of 220V for commercial use into a certain level of direct-current power, a high-frequency power generating circuit 52 (62, 72) for generating a certain level of high-frequency energy, an impedance matching circuit 53 (63, 73) for matching control of the high-frequency power generating circuit 52 (62, 72) with the load (impedance of the article F), and a transformer 54 (64, 74) for amplifying the output voltage from the high-frequency power generating circuit 52 (62, 72) to enable linking with a corresponding balance circuit on the output side.

Referring to each of the transformers 54, 64, 74, a coil L1 located on the input side is connected to the ground at one end thereof. On the other hand, one end of a coil L2 located on the load side is connected to the upper electrode 55a (65a, 75), whereas the opposite end of the coil L2 is connected to the lower electrode 55b (65b, 75b). In this embodiment, a balance circuitry configuration is adopted as a circuit arrangement on the side of the load. As an altered form, the balance circuit may be so configured as to connect an intermediate portion of the coil L2 of the transformer 54 (64, 74) to the ground. In the case where the high-frequency signal generating circuit 52 (62, 72) constitutes a balance circuit by itself, the transformer is not necessary to enable linking with the balance circuit on the side of the load including the opposing pair of upper and lower electrodes 55a and 55b (65a and 65b, 75a and 75b).

The impedance matching circuit 53 (63, 73) includes an electrostatic capacitance section C having a capacitor, and an inductance section L having the aforementioned conductor 57 (67, 77). To simplify the arrangement, as an example, the capacitance of each electrostatic capacitance section C is set at the same value while setting the inductance of the conductors 57, 67, 77 of the inductance section L at a fixed value different to one another to effect the impedance matching. More preferably, the capacitance of the electrostatic capacitance section C may be varied and a load impedance detecting sensor may be provided to conduct fine adjustment of the capacitance of the electrostatic capacitance section C in accordance with a change of the load impedance. Alternatively, the inductances of the inductance sections L of the impedance matching circuits 53, 63, 73 may be varied one from another.

The control circuit 1 controls the circulating speed of the endless belt 41 driven by the drive motor 45 in such a manner that the temperature of the article F reaches a predetermined temperature before the article F has completely passed through the thawing chamber 30 over the conveyor unit 40. As an altered form, the control circuit 1 may be designed to control the drive motor 45 to circulate the endless belt 41 depending on the kind and thickness of the article F at such a speed that has been obtained in advance by experiments to find out individual optimal circulating speeds by changing the kind and thickness of the article F. In this case, the control circuit 1 is so designed as to supply an optimal level of power to the high-frequency power generating circuit 52 (62, 72) by the power circuit 51 (61, 71) depending on the circulating speed of the endless belt 41, kind of the article F, and other parameters. In this way, the total amount of high-frequency energy to be supplied to the article F is controlled.

The control circuit 1 individually and independently controls the high-frequency power supply devices 5, 6, 7 to supply the power designated by the power setting switch 2d based on the thawing condition and the like. As an example, setting the power in such a manner as to stepwise lessening the power as approaching the outlet 32 enables to accomplish uniform thawing of the article F despite the fact that the article F is increasingly thawed as approaching the outlet 32. Power setting manner other than the above may also be applicable as far as an optimum thawed state is obtainable depending on the kind and thawing stage of the article F.

The high-frequency power supply device 5 (6, 7) may be driven by continuous driving in which power is continuously supplied while controllably varying the voltage or current, or intermittent driving in which power supply is intermittently effected while supplying the power or current at a constant level.

In the case of intermittent driving, for example, it may be preferable to fix either one of the drive time and pause time while varying the other for each of the high-frequency power supply devices 5, 6, 7. Alternatively, both of the drive time and the pause time may be varied. In the case of continuous driving, it may be preferable to stepwise change the matching condition of the high-frequency power supply devices 5, 6, 7 for overall control.

Figure 5:
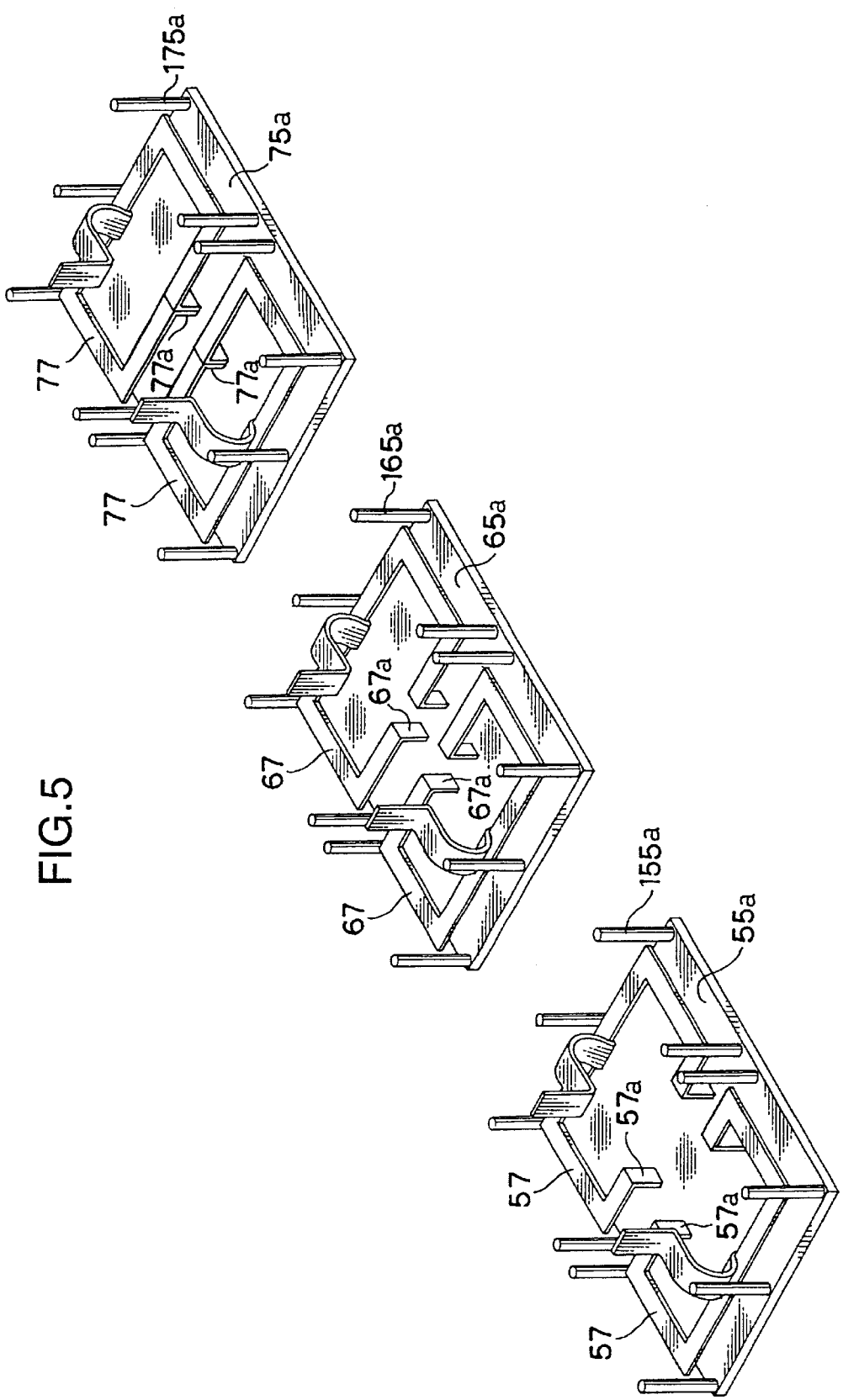
FIG. 5 is a perspective view showing a configuration of a conductor connecting a high-frequency generating circuit and an upper electrode of the high-frequency thawing apparatus.

In particular, as shown in FIG. 5, in this embodiment, the inductance section L of the impedance matching circuit 53 (63, 73) is constructed by the conductor 57 (67, 77) and a high-frequency power is supplied to the upper electrode 55a (65a, 75a) in such a manner that each inductance is varied as the length of each inductance section L changes. This arrangement makes it possible to use the power circuits 51, 61, 71, and high-frequency power generating circuits 52, 62, 72 of the same rating, respectively.

In the case of intermittent driving, heat generated inside the article F during driving of the thawing apparatus propagates over the entirety of the article F during the pause period. Accordingly, setting the drive period and/or pause period at an optimal value enables to accomplish more uniform state of temperature distribution of the article F, thereby establishing more uniform thawed state of the article F.

Next, a thawing operation of the article F with use of the thus constructed thawing apparatus in this embodiment is described. First, the up-and-down switch 2b is operated to set the distance between the article F and the upper electrode 55a (65a, 75a) at dl depending on the thickness of the article F. Then, the speed setting switch 2c is operated to control the drive motor 45 to set the transport speed of the endless belt 41 of the conveyor unit 40 appropriately. The power setting switch 2d is operated to set the output power supplied to each of the high-frequency power supply devices 5, 6, 7 appropriately.

Subsequently, when the main switch 2a is turned on, the high-frequency power supply devices 5, 6, 7 are started-up to start supply of a certain level of power to the opposing pairs of upper and lower electrodes 55a and 55b, 65a and 65b, 75a and 75b, respectively. Spontaneously, the endless belt 41 starts to circulate at a given speed, and the cooling device 3 starts its operation. Thereafter, a group of articles F are placed one after another automatically or manually onto the endless belt 41 in a series and carried inside the apparatus through the inlet 31 at a certain interval.

By the time when the first (and subsequent) article F of the group of articles reaches a downstream end (sic) of the opposing pair of upper electrode 55a and lower electrode 55b of the first-stage high-frequency power supply device 5 with respect to the transport direction of the conveyor unit 40, the article F is gradually started to be heated from a lead end thereof with respect to the transport direction of the conveyor unit 40 to thereby heat the entirety of the article F. The heating is continued until a tail end of the article F passes an upstream end (sic) of the upper and lower electrodes 55a and 55b with respect to the transport direction of the conveyor unit 40.

Subsequently, the article F is heated by the opposing pair of electrodes 65a and 65b of the second-stage high-frequency power supply device 6 and then by the opposing pair of electrodes 75a and 75b of the third-stage high-frequency power supply device 7, and then is discharged outside of the apparatus through the outlet 32.

It may be preferable to provide a proximate sensor near the upstream end and downstream end of the opposing pair of electrodes 55a and 55b (65a and 65b, 75a and 75b) of the high-frequency power supply device 5 (6, 7) to effect high-frequency power supply during the time exclusively when the article F passes in between the opposing pair of electrodes 55a and 55b (65a and 65b, 75a and 75b). This arrangement makes it possible to save the power corresponding to the time when the power is not directly used to thaw the article F, thus leading to energy saving of the apparatus.

In the case where the dimension of each article F is smaller than that of the electrode 55a (55b, 65a, 65b, 75a, 75b) and is transported serially one after another at a certain interval on the endless belt 41 of the conveyor unit 40 in a state that two or more of the group of articles may exist simultaneously in between the opposing pair of electrodes 55a and 55b, (65a and 65b, and 75a and 75b), it is highly likely that the electric field is concentrated on the first-carried article F, which has first passed the electric field, at a portion near the downstream end of the instant article F with respect to the transport direction of the conveyor unit 40. Thus, the article F is excessively heated at the downstream end thereof. It is highly likely that the same phenomenon occurs also in the case where the last-carried article of two or more of the group of articles that happen to exist simultaneously in the electric field is excessively heated at an upstream end thereof due to concentration of the electric field.

In view of the above likelihood, it may be preferable to provide a proximate sensor in the vicinity of the upstream and downstream ends of the high-frequency power supply device 5 (6, 7) with respect to the transport direction of the conveyor unit 40 in such a manner that the power supply is initiated when the first one of the articles has carried to a substantially intermediate position of the space defined by the opposing pair of electrodes 55a and 55b (65a and 65b, 75a and 75b) with respect to the transport direction of the conveyor unit 40 and that the power supply is paused when the last one of the articles has passed the substantially intermediate position.

Now, results of experiments in which various kinds of frozen articles were thawed with use of the high-frequency thawing apparatus of the above embodiment are shown in Tables 1 to 6.

Three kinds of samples as frozen article were prepared: A (beef), B (pork), and C (poultry meat). Two types of power supply system were tested: unbalance power supply system, and balance power supply system. Experiment 1 was conducted each with respect to the samples A, B, and C having a certain size in which the samples A, B, and C were thawed according to unbalance power supply system. Likewise, Experiment 2 was conducted each with respect to the samples A, B, and C having substantially the same size as that of the samples used in Experiment 1 in which the samples A, B, and C were thawed according to balance power supply system with the same output level as in Experiment 1. Various data such as initial temperature, temperature after thawing, temperature rise, thawing period and temperature distribution were collected by conducting Experiments 1 and 2 each with respect to samples A, B, and C. Parameters used in the above thawing tests and conditions thereon are described below.

Size and Weight of Sample:

| | | |
|---|---|---|
| A (Beef): | 570 × 350 × 170 (mm) | 27.2 kg |
| B (Pork): | 620 × 400 × 100 (mm) | 20.0 kg |
| C (Poultry): | 430 × 300 × 50 (mm) | 4.0 kg |
| Frequency of Power: | 13.56 MHz | |

Power Output:

| | |
|---|---|
| A (Beef): | 100 W/kg |
| B (Pork): | 120 W/kg |
| C (Poultry): | 250 W/kg |

Target Temperature after Thawing:

| | |
|---|---|
| A (Beef): | −3 to −4° C. |
| B (Pork): | −2 to −3° C. |
| C (Poultry): | −1 to −2° C. |

(1) Results on Sample A (Beef):

Table 1 shows the result of Experiment 1 in which the sample A (beef) was thawed according to unbalance power supply system. Table 2 shows the result of Experiment 2 in which the sample A (beef) was thawed according to balance power supply system.

TABLE 1

State of Sample A
(according to unbalance power supply system)

| | ① | ② | ③ | Average |
|---|---|---|---|---|
| Initial Temperature (° C.) | −18.5 | −17.8 | −18.1 | −18.1 |
| Temperature after Thawing (° C.) | −4.9 | −4.4 | −4.5 | −4.6 |
| Temperature Rise (ΔT) | 13.6 | 13.4 | 13.6 | 13.5 |
| Thawing Period (min.) | 18 | 18 | 18 | 18 |
| Temperature Rise per Unit Time (° C./min) | 0.76 | 0.74 | 0.76 | 0.75 |
| Output per Weight (W/kg) | 100 | 100 | 100 | 100 |
| (Kw · t/kg · ° C.) | 0.132 | 0.134 | 0.132 | 0.133 |
| Highest Temperature (° C.) | −2.5 | −2.7 | −2.0 | −2.4 |
| Lowest Temperature (° C.) | −6.2 | −5.4 | −5.9 | −5.8 |
| Temperature Difference (° C.) | 3.7 | 2.7 | 3.9 | 3.4 |

TABLE 2

State of Sample A
(according to balance power supply system)

| | ① | ② | ③ | Average |
|---|---|---|---|---|
| Initial Temperature (° C.) | −18.2 | −17.5 | −18.1 | −17.9 |
| Temperature after Thawing (° C.) | −3.7 | −3.5 | −4.1 | −3.8 |
| Temperature Rise (ΔT) | 14.5 | 14.0 | 14.0 | 14.2 |
| Thawing Period (min.) | 17 | 16 | 16 | 16.3 |
| Temperature Rise per Unit Time (° C./min) | 0.85 | 0.88 | 0.88 | 0.87 |
| Output per Weight (W/kg) | 100 | 100 | 100 | 100 |
| (Kw · t/kg · ° C.) | 0.117 | 0.114 | 0.114 | 0.115 |
| Highest Temperature (° C.) | −3.1 | −2.8 | −2.8 | −2.9 |
| Lowest Temperature (° C.) | −4.5 | −4.3 | −4.5 | −4.4 |
| Temperature Difference (° C.) | 1.4 | 1.5 | 1.7 | 1.5 |

According to Experiment 1 with respect to the sample A (see Table 1), the initial temperature of the sample A was −18.1° C., and according to Experiment 2 with respect to the sample A (see Table 2), the initial temperature of the sample A was −17.9° C. The temperature of the sample A rose to −4.6° C. after a thawing period of 18 minutes (temperature rise, 13.5° C.) in Experiment 1, while the temperature of the sample A rose to −3.8° C. after a thawing period of 16.3 minutes (temperature rise, 14.2° C.) in Experiment 2. Temperature rise per unit time (° C./min) was 0.75 in Experiment 1, while 0.87 in Experiment 2. Temperature variation (temperature difference in the unit of ° C.) inside the sample A after the thawing was 3.4° C. in Experiment 1, while 1.5° C. in Experiment 2.

As seen from Tables 1 and 2, it is clear that the sample A is thawed in a short period in a relatively uniform manner. Thus, it can be said that the performance of the thawing apparatus of the embodiment is sufficiently satisfactory for the sample A in practical use. However, it is clear from the results of Experiments 1 and 2 that balance power supply system is superior to unbalance power supply system in the aspects of temperature rise per unit time (unit: ° C./min) and temperature difference inside the sample A (unit: ° C.). It should be noted, however, that unbalance power supply system is more feasible in the aspect of control.

(2) Results on Sample B (Pork):

Table 3 shows the result of Experiment 1 in which the sample B (pork) was thawed according to unbalance power supply system. Table 4 shows the result of Experiment 2 in which the sample B (pork) was thawed according to balance power supply system.

TABLE 3

State of Sample B
(according to unbalance power supply system)

|  | ① | ② | ③ | Average |
|---|---|---|---|---|
| Initial Temperature (° C.) | −19.5 | −18.7 | −17.9 | −18.7 |
| Temperature after Thawing (° C.) | −3.5 | −3.3 | −3.0 | −3.3 |
| Temperature Rise (ΔT) | 16 | 15.4 | 14.9 | 15.4 |
| Thawing Period (min.) | 18 | 17 | 17 | 17.3 |
| Temperature Rise per Unit Time (° C./min) | 0.89 | 0.91 | 0.88 | 0.89 |
| Output per Weight (W/kg) | 120 | 120 | 120 | 120 |
| (Kw · t/kg · ° C.) | 0.135 | 0.132 | 0.137 | 0.135 |
| Highest Temperature (° C.) | −1.9 | −1.9 | −1.8 | −1.9 |
| Lowest Temperature (° C.) | −5.1 | −4.8 | −5.4 | −5.1 |
| Temperature Difference (° C.) | 3.2 | 2.9 | 3.6 | 3.2 |

TABLE 4

State of Sample B
(according to balance power supply system)

|  | ① | ② | ③ | Average |
|---|---|---|---|---|
| Initial Temperature (° C.) | −17.8 | −18.9 | −17.5 | −18.1 |
| Temperature after Thawing (° C.) | −3.5 | −3.3 | −3.5 | −3.4 |
| Temperature Rise (ΔT) | 14.3 | 15.6 | 14.0 | 14.6 |
| Thawing Period (min.) | 13 | 14 | 14 | 13.7 |
| Temperature Rise per Unit Time (° C./min) | 1.10 | 1.11 | 1.00 | 1.07 |
| Output per Weight (W/kg) | 120 | 120 | 120 | 120 |
| (Kw · t/kg · ° C.) | 0.109 | 0.108 | 0.120 | 0.112 |
| Highest Temperature (° C.) | −2.2 | −2.0 | −2.5 | −2.2 |
| Lowest Temperature (° C.) | −3.5 | −3.4 | −3.6 | −3.5 |
| Temperature Difference (° C.) | 1.3 | 1.4 | 1.1 | 1.3 |

TABLE 5

State of Sample C
(according to unbalance power supply system)

|  | ① | ② | ③ | Average |
|---|---|---|---|---|
| Initial Temperature (° C.) | −17.9 | −19.4 | −18.0 | −18.4 |
| Temperature after Thawing (° C.) | −2.0 | −2.5 | −2.1 | −2.2 |
| Temperature Rise (ΔT) | 15.9 | 16.9 | 15.9 | 16.2 |
| Thawing Period (min.) | 8.5 | 9 | 8.5 | 8.7 |
| Temperature Rise per Unit Time (° C./min) | 1.87 | 1.88 | 1.87 | 1.87 |
| Output per Weight (W/kg) | 250 | 250 | 250 | 250 |
| (Kw · t/kg · ° C.) | 0.134 | 0.133 | 0.134 | 0.134 |
| Highest Temperature (° C.) | −0.9 | −1.2 | −1.1 | −1.1 |
| Lowest Temperature (° C.) | −4.6 | −4.5 | −3.1 | −4.1 |
| Temperature Difference (° C.) | 3.7 | 3.3 | 2.0 | 3.0 |

TABLE 4

State of Sample C
(according to balance power supply system)

|  | ① | ② | ③ | Average |
|---|---|---|---|---|
| Initial Temperature (° C.) | −17.1 | −18.4 | −18.7 | −18.1 |
| Temperature after Thawing (° C.) | −2.5 | −2.1 | −2.5 | −2.4 |
| Temperature Rise (ΔT) | 14.6 | 16.3 | 16.2 | 15.7 |
| Thawing Period (min.) | 6.5 | 7.5 | 7.0 | 7.0 |
| Temperature Rise per Unit Time (° C./min) | 2.25 | 2.17 | 2.31 | 2.24 |
| Output per Weight (W/kg) | 250 | 250 | 250 | 250 |
| (Kw · t/kg · ° C.) | 0.111 | 0.115 | 0.108 | 0.111 |
| Highest Temperature (° C.) | −0.8 | −1.3 | −1.4 | −1.2 |
| Lowest Temperature (° C.) | −1.7 | −2.1 | −2.5 | −2.1 |
| Temperature Difference (° C.) | 0.9 | 0.8 | 1.1 | 0.9 |

According to Experiment 1 with respect to the sample B, the initial temperature of the sample B was −18.7° C. (see Table 3), and according to Experiment 2 with respect to the sample B, the initial temperature of the sample B was −18.1° C. (see Table 4). The temperature of the sample B rose to −3.3° C. after a thawing period of 17.3 minutes (temperature rise, 15.4° C.) in Experiment 1, while the temperature of the sample B rose to −3.4° C. after a thawing period of 13.7 minutes (temperature rise, 14.6° C.) in Experiment 2. Temperature rise per unit time (° C./min) was 0.89 in Experiment 1, while 1.07 in Experiment 2. Temperature variation (temperature difference in the unit of ° C.) inside the sample B after the thawing was 3.2° C. in Experiment 1, while 1.3° C. in Experiment 2.

As seen from Tables 3 and 4, it is clear that the sample B is thawed in a short period in a relatively uniform manner. Thus, it can be said that the performance of the thawing apparatus in the embodiment is sufficiently satisfactory for the sample B in practical use, as well as the sample A.

(3) Results on Sample C (Poultry):

Table 5 shows the result of Experiment 1 in which the sample C (poultry) was thawed according to unbalance power supply system. Table 6 shows the result of Experiment 2 in which the sample C (poultry) was thawed according to balance power supply system.

According to Experiment 1 with respect to the sample C, the initial temperature of the sample C was −18.4° C. (see Table 5), and according to Experiment 2 with respect to the sample C, the initial temperature of the sample C was −18.1° C. (see Table 6). The temperature of the sample C rose to −2.2° C. after a thawing period of 8.7 minutes (temperature rise, 16.2° C.) in Experiment 1, while the temperature of the sample C rose to −2.4° C. after a thawing period of 7 minutes (temperature rise, 15.7° C.) in Experiment 2. Temperature rise per unit time (° C./min) was 1.87 in Experiment 1, while 2.24 in Experiment 2. Temperature variation (temperature difference in the unit of ° C.) inside the sample C after the thawing was 3° C. in Experiment 1, while 0.9° C. in Experiment 2.

Also, as seen from Tables 5 and 6, it is clear that the sample C is thawed in a short period in a relatively uniform manner. Thus, it can be said that the performance of the thawing apparatus in the embodiment is sufficiently satisfactory for the sample C in practical use, as well as the samples A and B.

In this invention, a balance circuit which makes an electric field distribution equivalent at the time of positive and negative voltage supply is employed as a circuitry configuration on the load side including the opposing pair of upper and lower electrode, but the invention is not limited to the balance circuitry configuration. In the case of a thawing apparatus for thawing an article being transported with use of a conveyor unit 40, as far as it is designed that a plurality of high-frequency power supply devices are enabled to supply a voltage of a certain level individually different to each other or one another, an unbalance circuitry configuration may be applied in which an electric field distribution more or less differs at the time of positive and negative voltage supply.

In the embodiment, three sets of high-frequency supply devices are used. However, providing at least two sets of high-frequency supply devices makes it possible to accomplish the object of this invention. In this embodiment, the impedance matching circuits 53, 63, 73 are constructed in such a manner that the length of the conductors 57, 67, 77 each constituting the inductance section L is greater from upstream toward downstream with respect to the transport direction of the conveyor unit 40. However, the arrangement is not limited to the one in the embodiment. There may be an arrangement in which the length of the conductor 77 of the last-stage high-frequency power supply device 7 is longer than that of the conductor 57 (67) of the high-frequency power supply device 5 (6).

Exploitation in Industry

As described above, according to the high-frequency thawing apparatus of this invention, respective high-frequency powers are supplied from a plurality of pairs of electrodes arrayed apart at a certain interval in the transport direction of a conveyor belt carrying an article to be thawed to render the article subject to a high-frequency electric field one after another while passing in between each pair of the opposing electrodes. As the article is being carried, the article is heated by dielectric loss to thereby proceed the thawing. As the article is being transported on the conveyor belt, the thawing is progressed, and accordingly, the dielectric constant of the article rises. The impedance of the load (article) varies as the dielectric constant of the article rises. Since the present invention adopts the arrangement in which the length of the conductor constituting the inductance section of the impedance matching circuit is differentiated stepwise, impedance matching can be accomplished with ease. Namely, a group of articles transported in a series on the conveyor belt can be sequentially and uniformly thawed with heat by utilizing the high-frequency power supplied to each pair of electrodes in an impedance-matching manner.

Further, the apparatus is constructed such that the length of the conductor of each high-frequency power supply device is so set as to be lengthened from upstream toward downstream with respect to the transport direction of the conveyor belt and hence to increase the inductance of the high-frequency power supply device as the thawing is progressed. This arrangement enables to construct the remaining parts other than the high-frequency power devices of the apparatus with the identical configuration to each other, thereby contributing to production cost reduction of the apparatus. Further, this arrangement does not necessitate a control operation of individually controlling the high-frequency power supply devices corresponding to the respective pairs of electrodes.

Setting the distance between the adjacent ones of the opposing pairs of electrodes longer than that between the opposing pair of electrodes enables to minimize a mutual adverse influence due to the high-frequency electric field generated in the space between the opposing pairs of electrodes adjacent to each other.

Constructing at least one of the opposing pair of electrodes movable up and down enables to optimally adjust the distance between the opposing electrode pair or the distance between either one of the opposing electrode pair and the surface of the article, thereby making it possible to uniformly thaw the article.

Driving each of the high-frequency power supply devices intermittently allows heat generated in the article during the drive period thereof to propagate during a subsequent pause period. Thereby, uniform temperature distribution of the article can be accomplished.

Changing the time of at least one of the drive period and pause period during intermittent driving enables to supply an optimal level of high-frequency power in accordance with a thawed stage of the article, thereby accomplishing more uniform thawing of the article.

Setting the transport speed of the conveyor belt variable makes it possible to adjust the thawing period optimally depending on the thickness and kind of the article.

Constructing the circuit on the load side including an opposing pair of electrode of each of the high-frequency power supply devices with a balance circuit configuration enables to set the distribution of the high-frequency electric field generated in between the opposing electrode pair equivalent at TO the time of positive and negative voltage supply, thereby accomplishing uniform thawing of the article with heat.

Alternatively, constructing the circuit on the load side including an opposing pair of electrodes of each of the high-frequency power supply devices with an unbalance circuitry configuration in which either one of the electrodes is grounded enables to facilitate supply of high-frequency power in such a manner that the power is easily balanced among the high-voltage electrodes of the high-frequency power supply devices, thereby making the apparatus feasible to control.

What is claimed is:

1. A high-frequency thawing apparatus comprising:
   a conveyor unit for transporting an article to be thawed in a predetermined direction;
   a thawing chamber in which at least part of the conveyor unit over which the article is to be transported is encased;
   a plurality of opposing pairs of electrodes, each electrode pair arrayed side by side in the transport direction of the conveyor unit apart at a certain interval in the thawing chamber;
   a plurality of high-frequency power generating circuits provided in correspondence to the plurality of electrode pairs to generate a high-frequency field in between each pair of the electrodes; and
   a plurality of impedance matching circuits provided between the respective high-frequency power generating circuits and conductors each impedance matching circuit including a conductor with an inductance different to each other.

2. The high-frequency thawing apparatus according to claim 1, wherein the length of at least one of the conductors provided downstream from the other conductor with respect to the transport direction of the conveyor unit is longer than that of the other conductor.

3. The high-frequency thawing apparatus according to claim 2, wherein three pairs of the opposing electrodes are provided, and the respective conductors corresponding to the three pairs of electrodes have different lengths to one another.

4. The high-frequency thawing apparatus according to claim 2, wherein three pairs of the opposing electrodes are provided, and the length of the conductor corresponding to the most downstream-located electrode pair with respect to the transport direction of the conveyor unit is set longer than that of the other two conductors.

5. The high-frequency thawing apparatus according to claim 1, wherein the opposing electrode pairs are arranged such that the distance between the corresponding electrodes of the adjacent electrode pairs is longer than that between the opposing electrode pair.

6. The high-frequency thawing apparatus according to claim 1 further comprising a plurality of elevating units each adapted for moving at least one of the corresponding electrode pair up and down.

7. The high-frequency thawing apparatus according to claim 1, wherein the transport speed of the conveyor unit is set variable.

8. The high-frequency thawing apparatus according to claim 1, wherein each of the high-frequency power supply devices is intermittently driven.

9. The high-frequency thawing apparatus according to claim 8, wherein the intermittent driving is so controlled as to change at least one of a drive period and a pause period for each of the high-frequency power generating circuits.

10. The high-frequency thawing apparatus according to claim 1, wherein a circuit on a load side where a high-frequency power is to be supplied including the opposing electrode pair has a balance circuitry configuration.

11. The high-frequency thawing apparatus according to claim 1, wherein a circuit on a load side where a high-frequency power is to be supplied including the opposing electrode pair has an unbalance circuitry configuration.

* * * * *